United States Patent [19]

Banks

[11] 4,139,760
[45] Feb. 13, 1979

[54] ELECTRICALLY HEATED KITCHEN UTENSIL

[76] Inventor: Minnie V. Banks, 802 2nd St., SW., Clarion, Iowa 50525

[21] Appl. No.: 778,837

[22] Filed: Mar. 18, 1977

[51] Int. Cl.$^2$ .......................... H05B 1/00; A47J 1/02; B26B 1/00; A47J 43/28
[52] U.S. Cl. .................................... 219/227; 30/140; 30/337; 219/238; 219/240; 219/533
[58] Field of Search ............... 219/221, 227, 228, 229, 219/230, 236–239, 240, 533; 30/140, 337, 338

[56] References Cited

U.S. PATENT DOCUMENTS

| | | | |
|---|---|---|---|
| 515,045 | 2/1894 | Bultzingslowen | 30/337 X |
| 842,173 | 1/1907 | Carman | 30/337 X |
| 2,283,343 | 5/1942 | Weiskopf | 30/140 |
| 2,297,103 | 9/1942 | Holm | 30/140 |
| 2,468,818 | 5/1949 | Fox et al. | 219/239 |
| 2,654,122 | 10/1953 | Derby | 30/140 X |
| 3,902,043 | 8/1975 | Rogan | 219/238 |

FOREIGN PATENT DOCUMENTS

| | | | |
|---|---|---|---|
| 364664 | 11/1922 | Fed. Rep. of Germany | 219/228 |
| 856929 | 11/1952 | Fed. Rep. of Germany | 219/229 |
| 886351 | 8/1953 | Fed. Rep. of Germany | 219/229 |
| 1548303 | 10/1968 | France | 219/227 |
| 529592 | 11/1940 | United Kingdom | 30/140 |

*Primary Examiner*—A. Bartis
*Attorney, Agent, or Firm*—Daniel Jay Tick

[57] ABSTRACT

An electrically heated kitchen utensil has a thermally insulated handle provided with an internal electric heating unit adapted to releasably receive and heat a kitchen device, such as a knife, spoon, scoop, dipper or spatula. The heating unit comprises a pair of spaced parallel electric heating elements defining an channel which receives the shank of the kitchen device. The kitchen device is releasably secured in the channel by interengaged teeth on the shank and a spring biased pivoted member forming the bottom of the channel. The kitchen device is released by a release push button acting on the pivoted member to disengage the teeth. A rheostat is provided to regulate the heat output of the heating elements.

2 Claims, 10 Drawing Figures

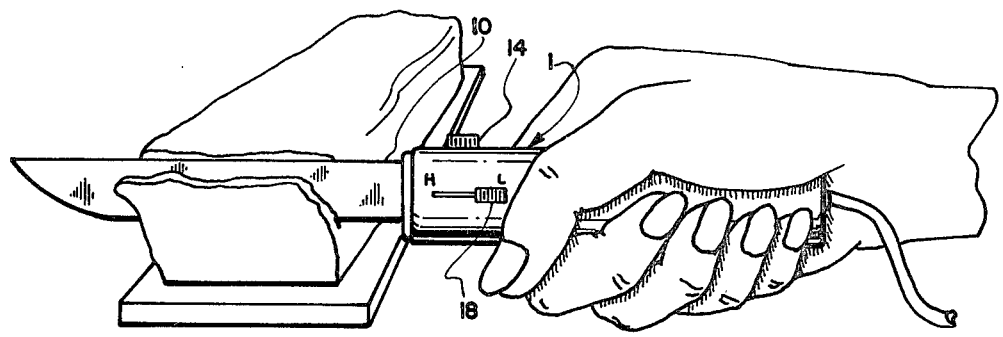
FIG. 1
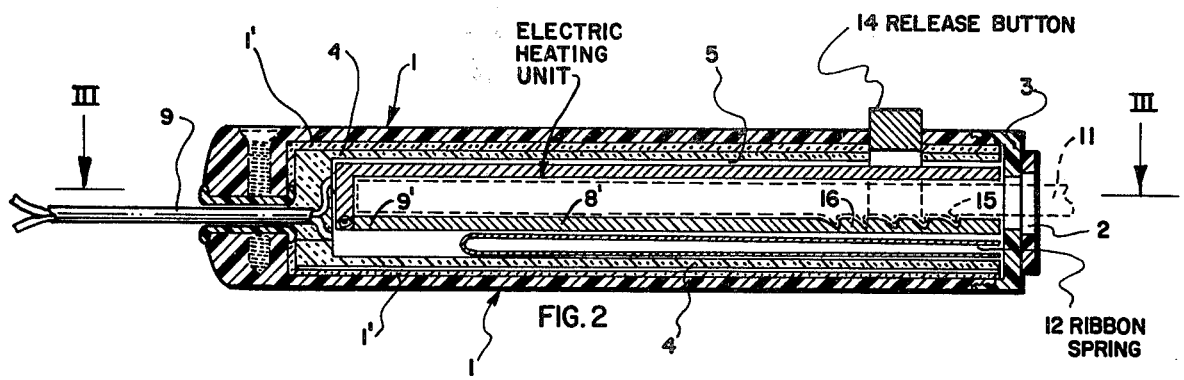
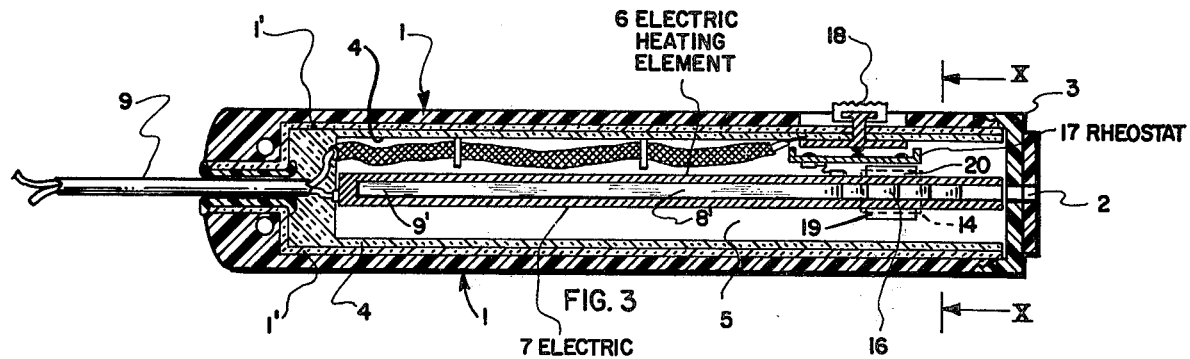
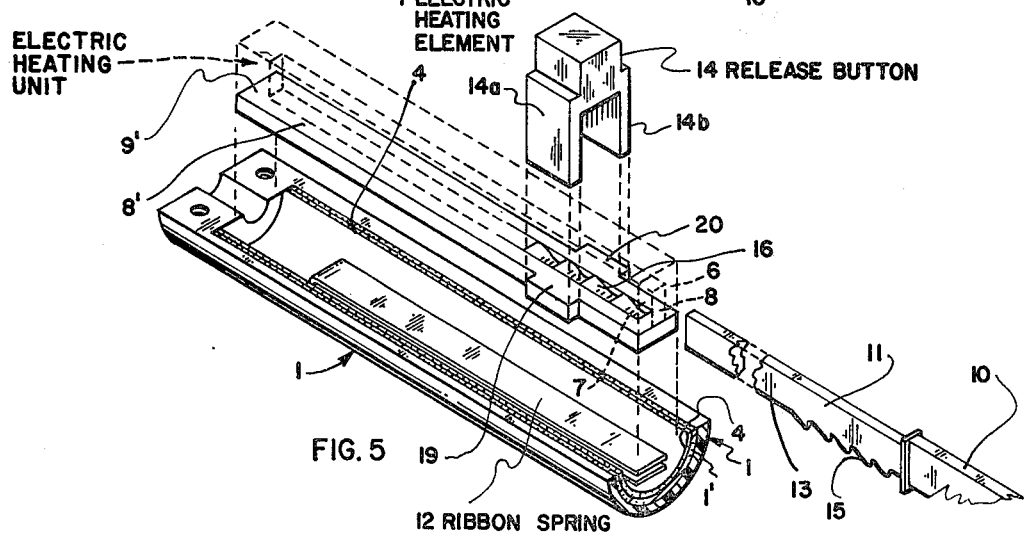

U.S. Patent   Feb. 13, 1979   Sheet 2 of 2   4,139,760
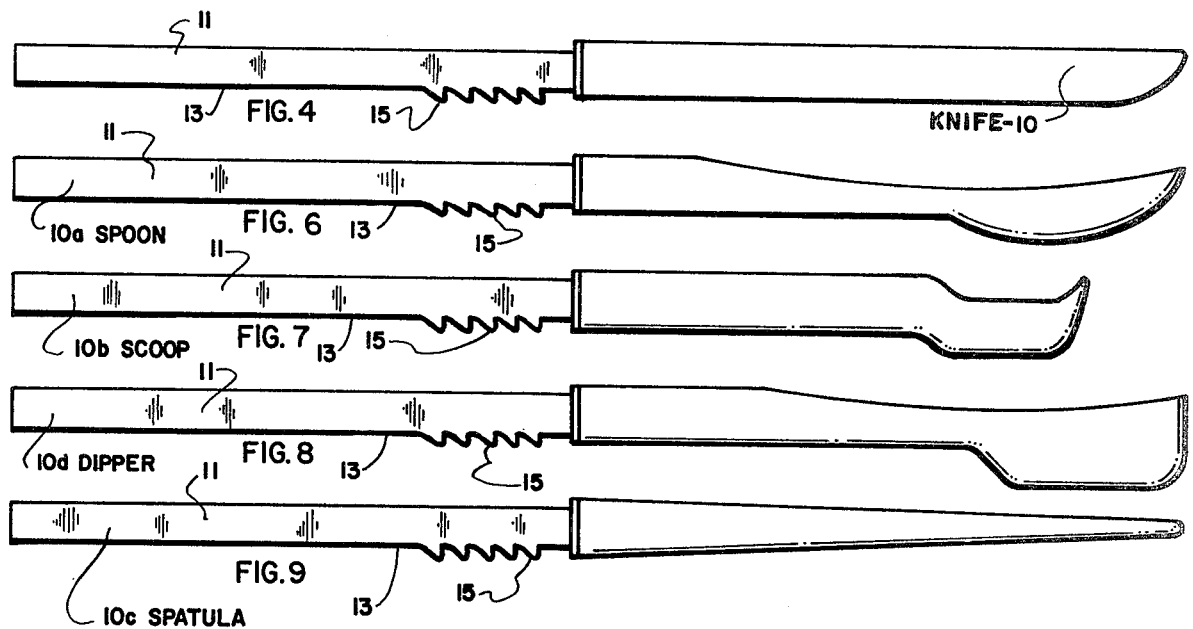
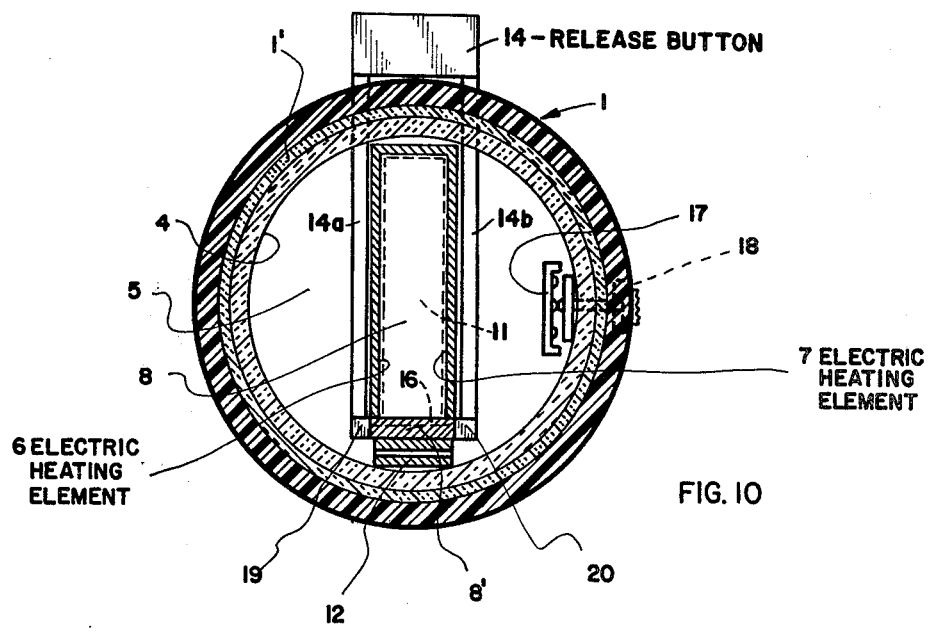

ELECTRICALLY HEATED KITCHEN UTENSIL

BACKGROUND OF THE INVENTION

The present invention relates to a kitchen utensil.

Objects of the invention are to provide a kitchen utensil of simple structure, which is inexpensive in manufacture, used with facility, convenience and safety, and functions efficiently, effectively and reliably to heat a kitchen device such as a knife blade, a spoon, a scoop, dipper, or the like.

BRIEF SUMMARY OF THE INVENTION

In accordance with the invention, a kitchen utensil comprises a substantially elongated hollow handle having a lining of thermally insulative material therein. The handle has an opening at one end. An additional lining of thermally insulative material is provided in a heating part of the handle. The additional lining has a front end and an opening at its front end registering with the opening of the handle. A pair of substantially parallel spaced electrical heating elements are provided in the additional lining of the heating part of the handle and form the side walls of a channel in the handle. The channel extends from the opening at the one end of the handle and has an open bottom, a closed top, a closed rear end and an open front end and said heating elements form an elongated electric heating unit in the handle. A member having front and rear ends is pivotally affixed to the heating elements at the rear end thereof. The pivoted member is positioned at the open bottom of the channel and has laterally extending portions. Electrical power supply conductors extend through the rear of the handle and are electrically connected to the heating elements for supplying electrical energy to said heating elements to generate heat. A kitchen device of thermally conductive material has a shank adapted to fit into the channel in engagement with the pivoted member and between the heating elements in the handle via the opening in the one end of the handle. Releasable securing means in the handle at the channel releasably secures the kitchen device in the channel in contact with the heating elements. The releasable securing means comprises interengageable teeth on the shank of the kitchen device and the pivoted member and a U-shaped ribbon spring between the pivoted member and the handle which presses the pivoted member against the shank of the kitchen device to hold the kitchen device tightly in the channel. A movable pushbutton member is provided at the top of the handle for manually depressing the pivoted member. The push-button member has means straddling the channel and engageable with the laterally extending portions of the pivoted member to depress the spring to move the pivoted member from the kitchen device thereby freeing said kitchen device for removal from the channel.

BRIEF DESCRIPTION OF THE DRAWINGS

In order that the invention may be readily carried into effect, it will now be described with reference to the accompanying drawings, wherein:

FIG. 1 is a view of an embodiment of the kitchen utensil of the invention in use;

FIG. 2 is a cross-sectional view, on an enlarged scale, of an embodiment of the handle of the kitchen utensil of the invention;

FIG. 3 is a cross-sectional view, taken along the lines III—III, of FIG. 2;

FIG. 4 is a view, on an enlarged scale, of an embodiment of a knife blade of the kitchen utensil of the invention;

FIG. 5 is an exploded view, on an enlarged scale, partly cutaway, and partly in section, of the embodiment of FIG. 1 with the end 3 deleted;

FIG. 6 is a view, on a reduced scale, of an embodiment of a spoon of the kitchen utensil of the invention;

FIG. 7 is a view, on a reduced scale, of an embodiment of a scoop of the kitchen utensil of the invention;

FIG. 8 is a view, on a reduced scale, of an embodiment of a dipper of the kitchen utensil of the invention;

FIG. 9 is a view, on a reduced scale, of an embodiment of a spatula of the kitchen utensil of the invention; and FIG. 10 is a cross-sectional view, on an enlarged scale, of an embodiment of FIG. 1, taken along the lines X—X, of FIG. 3.

DETAILED DESCRIPTION OF THE INVENTION

The kitchen utensil of the invention comprises a substantially elongated hollow handle 1 (FIGS. 1 to 3 and 5). The handle 1 has an opening 2 (FIGS. 2 and 3) at one end 3 thereof. The handle 1 preferably comprises rigid plastic with a fiberglass or refractory material lining 1'.

A lining of electrically insulative material 4 of any suitable type such as, for example, glass or refractory material, is provided in a heating part 5 of the handle, as shown in FIGS. 2, 3 and 5.

Electrical heating elements 6 and 7 (FIGS. 3 and 5) are fixedly positioned in the heating part 5 of the handle 1 as the side walls of a channel 8 in said handle and has an open bottom, a closed top, a closed rear end and an open front end formed in an elongated electric heating unit in said handle, as shown in FIGS. 2, 3 and 5, as shown in FIGS. 3 and 5. The channel 8 extends from the opening 2 at the end 3 of the handle. A member 8' is positioned beneath the heating elements 6 and 7 and is pivotally affixed to said heating elements at one end 9' thereof, as shown in FIG. 2. The pivoted member 8' has laterally extending portions 19 and 20 (FIGS. 3, 5 and 10).

Electrical conductors 9 (FIGS. 2 and 3) extend through the handle 1 and are electrically connected to the electrical heating elements 6 and 7 for supplying electrical energy to said heating elements to heat said elements.

A kitchen device of thermally conductive material of any suitable type such as, for example, stainless steel, has a part adapted to fit in the channel 8 between the heating elements 6 and 7 in the handle 1 via the opening 2 in the end 3 of said handle. The kitchen device rests on the pivoted member 8'. The kitchen device consists of a knife blade 10 (FIGS. 1, 4 and 5), a spoon 10a (FIG. 6), a scoop 10b (FIG. 7), a spatula 10c (FIG. 9), a dipper 10d (FIG. 8), or the like. The knife blade 10 has a shank 11 (FIGS. 4 and 5) adapted to fit in the channel 8 between the heating elements 6 and 7 of the handle 1 via the opening 2 in the end 3 of said handle. The shank 11 of the knife blade 10 rests on the pivoted member 8'.

A releasable securing device is provided in the handle 1 at the channel 8 for releasably securing the kitchen device 10 in said channel between the heating elements 6 and 7 and with shank 11 in engagement with pivoted member 8' in such a manner whereby when said heating elements 6 and 7 are heated, heat is transferred to the device 10 through shank 11. The releasable securing device comprises a U-shaped ribbon spring 12 (FIGS. 2 and 5) between the lining 4 and member 8', which spring biases member 8' upwardly against the lower edge of shank 11 of the kitchen device 10 (FIGS. 2, 5 and 10). The ribbon spring 12 presses against the member 8' to hold the kitchen device 10 tightly in the channel 8. A movable push-button release member 14 (FIGS. 2 and 5) is provided for manually depressing the spring 12 to move the pivoted member 8' out of engagement with the kitchen device 10 thereby freeing said kitchen device for removal from the channel. The release button 14 has a pair of spaced parallel arms 14a and 14b (FIGS. 5 and 10) straddling the channel 8, as shown in FIGS. 5 and 10, and abutting the laterally extending portions 19 and 20, respectively, of the pivoted member 8' and thereby depresses said pivoted member to depress the spring 12 beneath the pivoted member.

The one edge 13 of the part 11 of the kitchen device 10 has a plurality of teeth 15 formed therein which extending beyond said edge 13, as shown in FIGS. 4 to 9. Corresponding teeth 16 are provided in the pivoted member 8' (FIGS. 2, 3 and 5) to releasably clamp the kitchen device in the handle 1 to prevent said kitchen device from falling out of said handle when said device is subjected to the pressure of the spring 12.

The amount of current supplied to the heating elements 6 and 7, and therefore the intensity of heat produced by said heating elements, is manually controlled via a variable resistor rheostat 17 of any suitable type in the handle 1 connected in circuit between the electrical conductors 9 and said heating elements. The variable resistor 17 has a knob or dial 18 which extends from the housing to facilitate manual rotation thereof.

The rheostat or variable resistor 17 does not interfere with the movement of the release button 14, since said button abuts the laterally extending portions 19 and 20 of the pivoted member 8' (FIGS. 3, 5 and 10), which portions are clear of said rheostat, as shown in FIG. 3.

While the invention has been described by means of a specific example and in a specific embodiment, I do not wish to be limited thereto, for obvious modifications will occur to those skilled in the art without departing from the spirit and scope of the invention.

I claim:

1. A kitchen utensil, comprising
   a substantially elongated hollow handle having a lining of thermally insulative material therein, said handle having an opening at one end;
   an additional lining of thermally insulative material in a heating part of the handle, said additional lining having a front end and an opening at its front end registering with the opening of the handle;
   a pair of substantially parallel spaced electrical heating elements in the additional lining of the heating part of the handle, said heating elements forming the side walls of a channel in said handle, said channel extending from the opening at said one end of the handle and having an open bottom, a closed top, a closed rear end and an open front end, said heating elements defining an elongated electric heating unit in said handle;
   a member having front and rear ends, said member being pivotally affixed to the heating elements at said rear end thereof and being positioned at the open bottom of the channel, said pivoted member having laterally extending portions;
   electrical power supply conductors extending through the rear of the handle and electrically connected to the heating elements for supplying electrical energy to said heating elements to generate heat;
   a kitchen device of thermally conductive material having a shank adapted to fit into the channel in engagement with the pivoted member and between the heating elements in the handle via the opening in the one end of the handle; and
   releasable securing means in the handle at the channel for releasably securing the kitchen device in said channel in contact with the heating elements in a manner whereby when the heating elements generate heat the kitchen device is heated, said releasable securing means comprising interengageable teeth on the shank of said kitchen device and said pivoted member, a U-shaped ribbon spring between said pivoted member and the handle and pressing said pivoted member against said shank of said kitchen device to hold said kitchen device tightly in the channel, and a movable pushbutton member at the top of the handle for manually depressing said pivoted member, said pushbutton member having means straddling the channel and engageable with the laterally extending portions of the pivoted member for depressing said member against the bias of said spring to disengage the interengaged teeth of on said shank and pivoted member, thereby freeing said kitchen device for removal from the channel.

2. A kitchen utensil as claimed in claim 1, wherein the kitchen device is one of a group consisting of a knife blade, a spoon, a scoop, a spatula and a dipper.

* * * * *